United States Patent
Pope

(10) Patent No.: US 9,305,241 B2
(45) Date of Patent: Apr. 5, 2016

(54) SYSTEMS AND METHODS FOR REDUCING A DATA SET

(71) Applicant: Google Inc., Mountain View, CA (US)

(72) Inventor: Arthur Robert Pope, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 274 days.

(21) Appl. No.: 13/953,030

(22) Filed: Jul. 29, 2013

(65) Prior Publication Data
US 2015/0029186 A1    Jan. 29, 2015

(51) Int. Cl.
| | | |
|---|---|---|
| G06T 7/00 | (2006.01) |
| G06K 9/62 | (2006.01) |
| G01S 17/50 | (2006.01) |
| G01S 17/89 | (2006.01) |
| G01S 7/48 | (2006.01) |
| G06K 9/00 | (2006.01) |

(52) U.S. Cl.
CPC ............. *G06K 9/6228* (2013.01); *G01S 7/4808* (2013.01); *G01S 17/50* (2013.01); *G01S 17/89* (2013.01); *G06K 9/00214* (2013.01); *G06T 2207/10028* (2013.01)

(58) Field of Classification Search
None
See application file for complete search history.

(56) References Cited

U.S. PATENT DOCUMENTS

| | | |
|---|---|---|
| 2005/0203930 A1 | 9/2005 | Bukowski et al. |
| 2006/0125680 A1* | 6/2006 | Thackray .................. 342/54 |
| 2010/0030473 A1* | 2/2010 | Au et al. .................. 701/301 |
| 2011/0113009 A1* | 5/2011 | Gupta et al. ............. 707/609 |
| 2013/0028482 A1 | 1/2013 | Crews |
| 2013/0223702 A1* | 8/2013 | Holsing et al. .......... 382/128 |
| 2013/0257852 A1* | 10/2013 | Meeker et al. ........... 345/419 |
| 2014/0058676 A1* | 2/2014 | De Prisco et al. ........ 702/2 |

OTHER PUBLICATIONS

Himmelsbach, Michael, et al. "LIDAR-based 3D object perception" Proceedings of 1st international workshop on cognition for technical systems. vol. 1. 2008.*
Himmelsbach et al., "LIDAR-Based 3D Object Perception", In Proceedings of 1st International Workshop on Cognition for Technical Systems, München,Germany, Oct. 2008, 7 pages.
Salvaggio, "Integration of Heterogeneous Three-Dimensional Point Cloud Processing Algorithms", Thesis, Chester F. Carlson Center for Imaging Science Rochester Institute of Technology, Feb. 25, 2012, 38 pages.

* cited by examiner

*Primary Examiner* — Phi Hoang
*Assistant Examiner* — Diane Wills
(74) *Attorney, Agent, or Firm* — Dority & Manning, P.A.

(57) ABSTRACT

Systems and methods for reducing a point cloud data set are provided. According to aspects of the present disclosure, a method includes receiving a point of a point cloud data set, the point having three-dimensional coordinates. The point's coordinates are mapped to a location to determine whether a different point's coordinates have already been mapped to the location. The point is discarded when a different point's coordinates have been mapped to the location.

17 Claims, 4 Drawing Sheets

US 9,305,241 B2

SYSTEMS AND METHODS FOR REDUCING A DATA SET

FIELD

The present disclosure relates generally to reducing a data set particularly, to reducing a point cloud data set.

BACKGROUND

Three-dimensional models can be generated from data acquired by a range sensor, such as a laser range sensor. For instance, a three-dimensional model of a streetscape can be generated from data points representative of distances to a surface taken from a range sensor from a perspective at or near the ground level. The data points can be part of a three-dimensional point cloud, with each point having a defined three-dimensional location. The data points associated with a surface can be used to construct a polygon mesh (e.g., a triangle mesh) modeling the surface.

Among collected data points are typically many duplicate data points. Such duplicate data points can be collected when the sensor acquiring the data points is temporarily stopped, or when the sensor sweeps across an area that has previously been sensed. Duplicate data points greatly increase the volume of data to be processed and can also impact certain modeling algorithms.

SUMMARY

Aspects and advantages of the invention will be set forth in part in the following description, or may be obvious from the description, or may be learned through practice of the invention.

One exemplary aspect of the present disclosure is directed to a computer-implemented method of reducing a point cloud data set. The method includes receiving a point of a point cloud data set, the point having three-dimensional coordinates. The point's coordinates are mapped to a location to determine whether a different point's coordinates have already been mapped to the location. The point is discarded when a different point's coordinates have been mapped to the location. When a different point's coordinates have not been mapped to the location and a number of points added is equal to a predetermined number of points, an oldest of the points added is indicated as no longer occupying the points added and coordinates of the oldest of the points added are indicated as no longer mapped to a location associated with the coordinates of the oldest of the points added. In addition, the point is indicated as occupying the points added and the point's coordinates are indicated as mapped to the location. When a different point's coordinates have not been mapped to the location and the number of points added is less than the predetermined number of points, the point is indicated as occupying the points added and the point's coordinates are indicated as mapped to the location.

Other exemplary aspects of the present disclosure are directed to systems, apparatus, non-transitory computer-readable media, user interfaces and devices for merging three-dimensional models.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
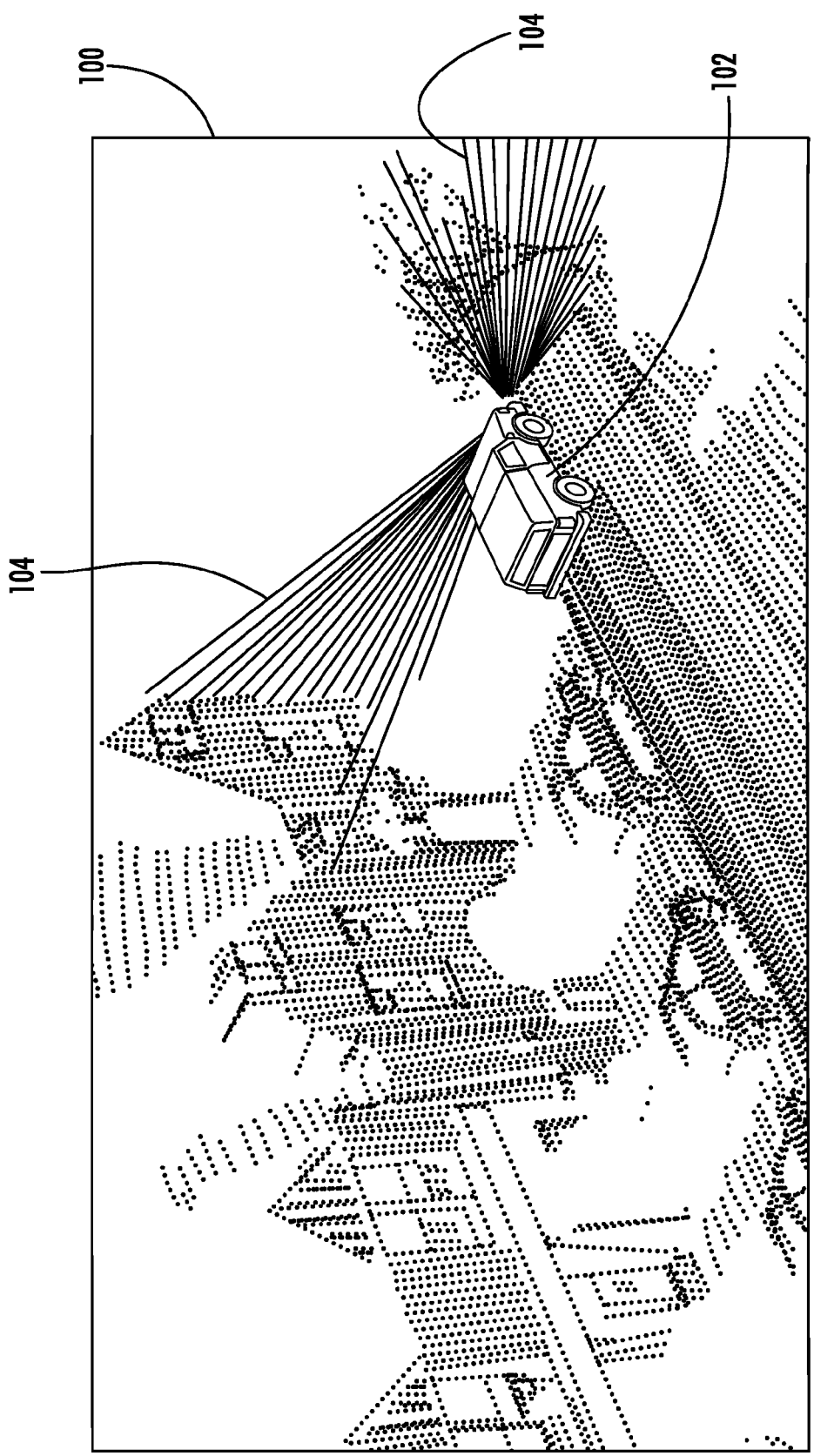
FIG. 1 depicts an exemplary three-dimensional point cloud according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for reducing a data set. In particular, the systems and methods can identify and remove duplicate points derived from range sensor data, such as light detection and ranging (LIDAR) data. A data structure can be utilized to hold a predetermined number of points derived from such data. The number of points can be chosen to be large enough to span recent duplicate points with the recognition that any duplicate point of a data set is likely to duplicate a point that has been sensed with relative recency relative to the duplicate point. A data structure can also be utilized to hold each point's coordinates at a resolution comparable to the precision of the data sample while being large enough to contain any subsequence of the predetermined number of points. In any relatively short interval of time, all points sensed during the interval of time are likely to occupy a relatively small volume.

In an exemplary embodiment, the systems and methods process points of a data set in the order detected. However, as described herein, in certain aspects of the present disclosure, points of a data set can be processed in reverse order of detection. To process a point, that point's coordinates are mapped to determine if another point has already been mapped to the same location. If another point has already been mapped to the same location, the subsequent point is discarded. If another point has not already been mapped to the location, a determination is made as to whether the number of previously added points is equal to a predetermined number of points. When the number of previously added points is equal to the predetermined number of points, the oldest of the previously added points is removed and its corresponding location is marked as having no point mapped thereto. The point being processed is then added to the number of previously added points and its corresponding location is marked as having a point mapped thereto. If the number of previously added points is less than a predetermined number of points, the point being processed is added to the number of previously added points and its corresponding location is marked as having a point mapped thereto.

The approach described herein allows for efficient removal of duplicate points in a data set. The remaining points can be processed further as needed without requiring resources to be unnecessarily dedicated towards the processing of duplicate points.

With reference now to the figures, exemplary embodiments of the present disclosure will be discussed in detail. The figures illustrate two-dimensional representations for purposes illustration and discussion. One of ordinary skill in the art, using the disclosures provided herein, will recognize that the two dimensional representations can be representative of three-dimensional elements.

FIG. 1 depicts an exemplary three-dimensional point cloud 100 according to an exemplary embodiment of the present disclosure. Three-dimensional point cloud 100 can include a plurality of points, with each point having a defined three-dimensional location. Generally, each point in three-dimensional point cloud 100 represents some level of evidence that a physical item exists at the three-dimensional space corresponding to such point.

Three-dimensional point cloud 100 can be generated using any appropriate technique or combination of techniques, including, without limitation, laser scanning, structure from motion, multi-view stereo algorithms, or other suitable forms of computer vision or computer operation.

Preferably, three-dimensional point cloud 100 is defined in three-dimensional Cartesian space. However, other coordinate systems can be used, including cylindrical or spherical coordinate systems.

According to an aspect of the present disclosure, three-dimensional point cloud 100 can be generated from a scanning LIDAR range sensor mounted on a vehicle 102. In certain aspects of the present disclosure, the sensor can be mounted to sense sideways from the sensor's direction of travel. One of ordinary skill in the art will appreciate that the sensor can sense a suitable number of points per second at a suitable resolution in one or more vertical fan(s) 104 as are represented in FIG. 1.

The collected data can include duplicate data points, or data points with substantially identical three-dimensional locations as previously collected data points. Any duplicate point of a data set is likely to duplicate a point that was sensed a very short period of time earlier, such as milliseconds earlier. Duplicate data points can be sensed in a variety of situations, such as when a sensor is stopped at a location (e.g., at a traffic signal), or when a sensor is turned and sweeps back across a scene that has previously been sensed. A record of the locations of recent unique data points can be maintained with sufficient precision to detect many duplicate data points within a defined volume.

Figure 2A:
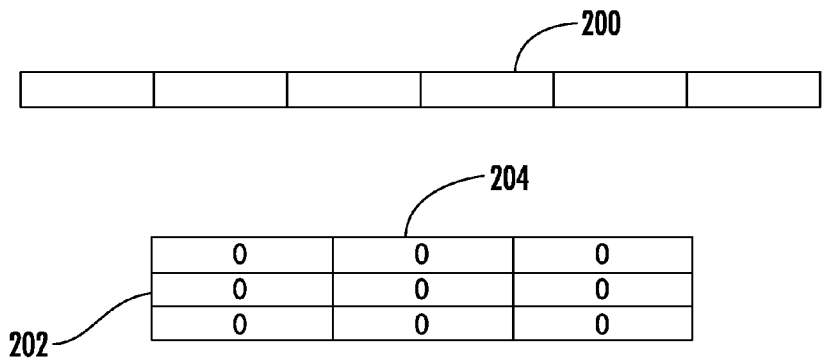
FIGS. 2A-2C depicts an exemplary queue and corresponding occupancy grid according to an exemplary embodiment of the present disclosure.

FIG. 2A depicts a first in first out queue 200 and corresponding occupancy grid 202 in accordance with the present disclosure. Although represented two-dimensionally, the occupancy grid is intended to be representative of a three-dimensional occupancy grid. Data points can be processed in the order the points were detected such that the first in first out queue maintains a predetermined number m of the most recent data points processed and determined to be unique. The occupancy grid can have dimensions that are large enough to be likely to contain any subsequence of m points. In the illustrated example, m equals 6 but it should be understood that m has been selected for purposes illustration and discussion only and would typically be a number large enough to span any duplicate data points. For instance, in certain aspects of the present disclosure, m can be between 1,000 and 1,000,000,000 points. However, it should be understood that any suitable number for m can be utilized in accordance with the present disclosure. It should also be appreciated that when the present subject matter is described in relation to a queue, any suitable data structure that allows maintenance of the most recent m points that have been processed can be utilized.

In addition, it should be understood that the occupancy grid need not span an entire area of interest. The occupancy grid can be large enough such that m consecutive unique points will typically occupy a relatively small fraction of the grid. Three-dimensional space can be mapped on an occupancy grid cyclically (i.e., with aliasing). If the occupancy grid is sufficiently large with respect to m, false reports of duplicates can be avoided.

In some embodiments of the present disclosure, a certain degree of false reports of duplicates can be tolerated. Such duplicates can be further reduced by increasing the scope (size) of the occupancy grid. Similarly, in some embodiments of the present disclosure, a certain degree of retained duplicates can be tolerated, but can be further reduced by increasing m.

A three-dimensional occupancy grid can include a resolution comparable to that of the sensor's precision. In certain implementations of the present disclosure, the three-dimensional occupancy grid can be an array of voxels that has a resolution, or voxel size, comparable to that of the sensor's precision. For instance, certain LIDAR sensors can have a precision of from about 1 cm to about 20 cm, and more particularly from about 5 cm to about 15 cm, resulting in a resolution of from about 1 cm to about 20 cm, and more particularly from about 5 cm to about 15 cm. The three-dimensional occupancy grid can have dimensions of from about 10 m×10 m×10 m to about 1000 m×1000 m×1000 m, and more particularly from about 50 m×50 m×50 m to about 150 m×150 m×150 m. However, it should be understood that any suitable precision or dimension can be utilized in accordance with the present disclosure. Further, any suitable substitute for an occupancy grid such as a hash table or the like can be utilized. For example, the quantized X, Y, and Z coordinates of a data point can be hashed to obtain an index into a hash table.

Figure 2B:
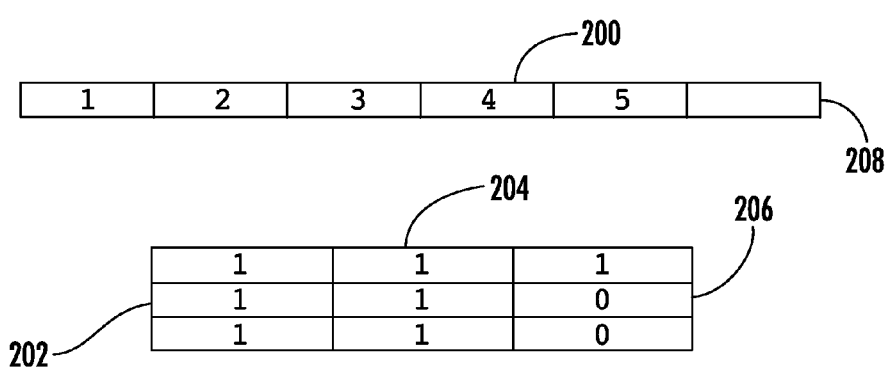

Referring again to FIG. 2A, each grid cell 204 of the occupancy grid can contain a single bit. As illustrated, initially the first in first out queue is empty and the grid cells are initialized to 0. FIG. 2B depicts the first in first out queue 200 of FIG. 2A, containing less than m points, namely 5 points, and corresponding occupancy grid 202 in accordance with the present disclosure. As described previously, data points of a data set are processed in the order detected. Each data point is mapped to a grid cell according to that point's coordinates. For instance, in each of three dimensions, a mapper module can take the remainder of dividing each coordinate by the overall grid size and quantize that to the nearest grid cell. Turning to FIG. 2B, if the next data point in the data set is processed, and the mapper module maps the data point's coordinates to grid cell 206, the grid cell value of 0 would be set to 1. Since the first in first out queue contains less than m points, new point 6 can be added to the queue at 208.

Figure 2C:
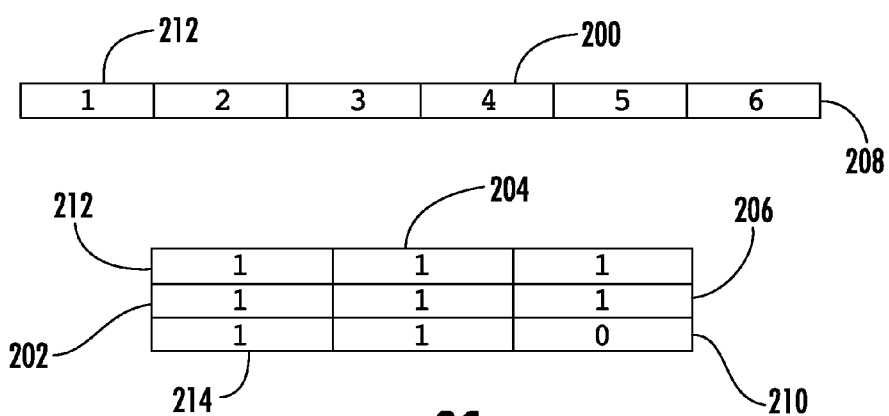

FIG. 2C depicts the first in first out queue 200 of FIG. 2B after a data point's coordinates have been mapped to grid cell 206 of occupancy grid 202 and new point 6 has been added to the queue at 208. As such, first in first out queue contains m points, namely 6 points. If the next data point in the data set is processed, and the mapper component maps the data point's coordinates to grid cell 206, the grid cell value of 1 would trigger the data point being discarded as a duplicate data point. If the data point is not discarded because the grid cell to which the data point is to be mapped has a value of 0, such as grid cell 210, the data point can be considered a new, unique data point. However, since the first in first out queue contains m points, the oldest point 1 at 212 would be removed from the queue and the grid cell to which its associated data point is mapped, such as 214, would be set to 0. The new point would be added to the first in first out queue at 212 and the grid cell 210 to which its associated data point is mapped would be set to 1.

Figure 3:
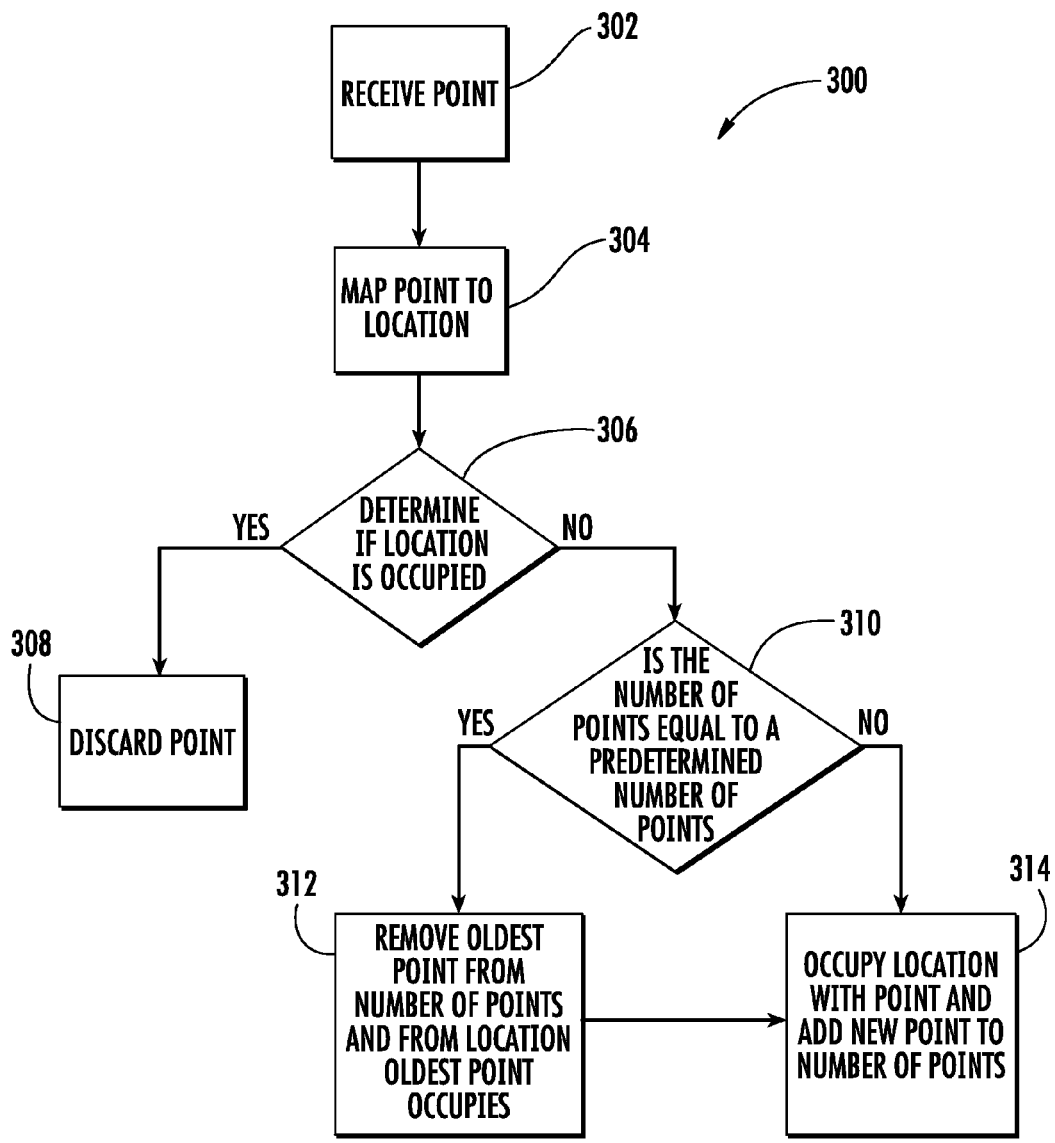
FIG. 3 depicts a flow diagram of an exemplary method for reducing a data set according to an exemplary embodiment of the present disclosure.

FIG. 3 depicts a flowchart of an exemplary method (300) for reducing a point cloud data set. Method (300) can be implemented using any suitable computing system, including a computing system having a memory and a processor. In addition, although FIG. 3 depicts steps performed in a particular order for purposes of illustration and discussion, methods of the present disclosure are not limited to such particular order or arrangement. One skilled in the art, using the disclosures provided herein, will appreciate that various steps of the method (300) can be omitted, rearranged, combined, and/or adapted in various ways without deviating from the scope of the present disclosure.

At (302), a data point from a data set is received. The data set can include point cloud data, such as point cloud data sensed from a scanning LIDAR range sensor. The method receives data points in the order detected. For instance, data points received can be from a data set that was previously sensed and stored for further processing in a manner which allows for the order in which the points were detected to be ascertained. In certain aspects of the present disclosure, data points can be received and processed in real-time as they are being sensed.

Additionally, although the present disclosure describes that data points are processed in the order detected, it should be understood that the systems and methods could be applied with the same effectiveness if data points were received and processed in the reverse order of detection.

At (304), a received data point is mapped to a location. Each data point can be mapped according to that data point's coordinates. For instance, in certain aspects of the present disclosure, an occupancy grid can be utilized in which, in each of three dimensions, each coordinate of a data point can be divided by an overall grid size and the remainder can be quantized to a nearest grid cell to determine the location to which the data point is to be mapped.

At (306), a determination is made as to whether the location to which the data point is to be mapped is already occupied. With reference to FIG. 2B, occupancy grid (204) can be utilized to determine if the location to which the data point is to be mapped is occupied by another data point. To designate occupancy and vacancy, available grid cells can be set to 0 and occupied grid cells can be set to 1. Referring again to FIG. 3, if the location to which the data point is to be mapped is occupied by another data point, at (308) the data point is discarded. In this regard, each discarded point can be stored in another location as desired.

If the location to which the data point is to be mapped is not occupied by another data point, then at (310) a determination is made as to whether the number of most recent points processed is equal to a predetermined number of points. The predetermined number of points can be chosen to be large enough to span any duplicates. For example the predetermined number of points can be large enough such that that the probability of missing a duplicate is less than some predetermined threshold. Referring to FIG. 2C, a queue is illustrated in which the number of most recent points processed is equal to the predetermined number of points m. Turning back to FIG. 3, in such cases in which the number of most recent points processed is equal to a predetermined number of points, at (312) an oldest point is removed from the number of recent points processed and its associated data point is no longer mapped to a location. When an oldest point is removed, that point's grid cell is marked as available. At (314), the data point to be mapped is mapped to the location determined at (304) and the point is added to queue of most recent points processed.

If the location to which the data point is to be mapped is not occupied by another data point, and the number of most recent points processed is less than a predetermined number of points, the method proceeds from (310) directly to (314). At (314), the data point to be mapped is mapped to the location determined at (304) and the point is added to queue of most recent points processed.

Figure 4:
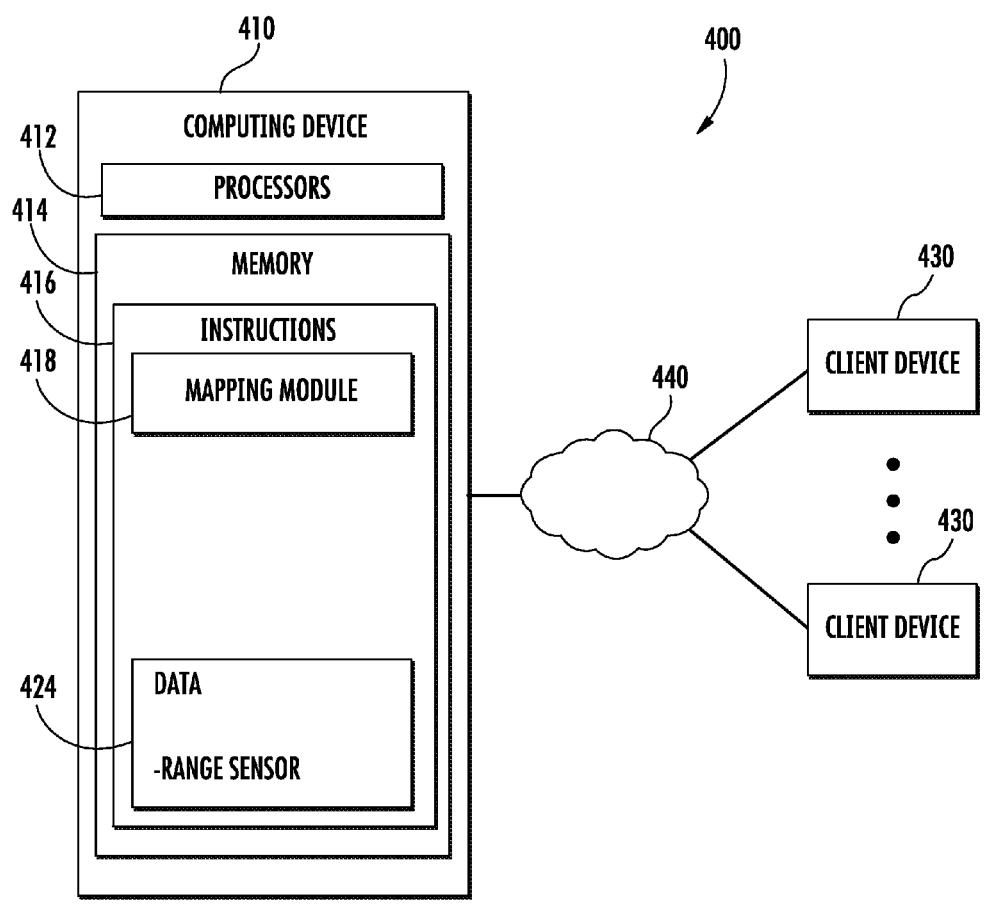
FIG. 4 depicts an exemplary computer-based system for reducing a data set according to an exemplary embodiment of the present disclosure.

FIG. 4 depicts an exemplary computing system 400 that can be used to implement the methods and systems for reducing a point cloud data set according to exemplary aspects of the present disclosure. The system 400 includes a computing device 410. The computing device 410 can be any machine capable of performing calculations automatically. For instance, the computing device can include a general purpose computer, special purpose computer, laptop, desktop, integrated circuit, mobile device, smartphone, tablet, or other suitable computing device. The computing device 410 can have a processor(s) 412 and a memory 414. The computing device 410 can also include a network interface used to communicate with one or more remote computing devices (e.g. client devices) 430 over a network 440. In one exemplary implementation, the computing device 410 can be a server, such as a web server, used to host a geographic information system, such as the Google Maps™ and/or the Google Earth™ geographic information systems provided by Google Inc.

The processor(s) 412 can be any suitable processing device, such as a microprocessor, microcontroller, integrated circuit, or other suitable processing device. The memory 414 can include any suitable computer-readable medium or media, including, but not limited to, RAM, ROM, hard drives, flash drives, or other memory devices. The memory 414 can store information accessible by processor(s) 412, including instructions 416 that can be executed by processor(s) 412. The instructions 416 can be any set of instructions that when executed by the processor(s) 412, cause the processor(s) 412 to provide desired functionality. For instance, the instructions 416 can be executed by the processor(s) 412 to implement a mapper module 418.

The mapper module 418 can be configured to map a data point's coordinates to a suitable data structure. Suitable data structures can include three-dimensional occupancy grids, such as one or more arrays of voxels. For instance, in each of three dimensions, a mapper module can take the remainder of dividing each coordinate by the overall grid size and quantize that to the nearest grid cell. When a data point in a data set is processed, the mapper module can map the data point's coordinates to a grid cell, and the grid cell value of 0 can be set to 1. In certain aspects of the present disclosure, quantized X, Y, and Z coordinates of a point can be hashed by mapper module 418 to obtain an index into a hash table.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 414 can also include data 424 that can be retrieved, manipulated, created, or stored by processor(s) 412. For instance, memory 414 can store data 424 associated with range sensor (s). In certain aspects of the present disclosure, the range sensor(s) can be a LIDAR sensor. However, any suitable sensor is contemplated in connection with the present disclosure.

The data 424 can also data associated with one or more data sets and point clouds according to exemplary aspects of the present disclosure. The data 424 can be stored in one or more databases. The one or more databases can be connected to the computing device 410 by a high bandwidth LAN or WAN, or can also be connected to computing device 410 through network 440. The one or more databases can be split up so that it is located in multiple locales.

The computing device 410 can exchange data with one or more client devices 430 over the network 440. Although two clients are illustrated in FIG. 4, any number of clients 430 can be connected to the computing device 410 over the network 440. The client devices 430 can be any suitable type of computing device, such as a general purpose computer, special purpose computer, laptop, desktop, integrated circuit, mobile device, smartphone, tablet, or other suitable computing device. Responsive to a request for information, the computing device 410 can encode data in one or more data files and provide the data files to the client devices 430 over the network 440.

The network 440 can be any type of communications network, such as a local area network (e.g. intranet), wide area network (e.g. Internet), or some combination thereof. The network 440 can also include a direct connection between a client device 430 and the computing device 410. In general, communication between the computing device 410 and a client device 430 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of reducing a point cloud data set comprising:
   receiving, by one or more computing devices, a point of a point cloud data set, the point comprising three-dimensional coordinates, wherein the point is received in the order the point was detected;
   mapping, by the one or more computing devices, the point's coordinates to a location to determine whether a different point's coordinates have already been mapped to the location;
   discarding by the one or more computing devices, the point when a different point's coordinates have been mapped to the location;
   when a different point's coordinates have not been mapped to the location and a number of points added after discarding is equal to a predetermined number of points:
      indicating, by the one or more computing devices, an oldest of the points added is no longer occupying the points added and that coordinates of the oldest of the points added are no longer mapped to a location associated with the coordinates of the oldest of the points added; and
      indicating, by the one or more computing devices, that the point occupies the points added in the order the point was received and that the point's coordinates are mapped to the location; and
   when a different point's coordinates have not been mapped to the location and the number of points added is less than the predetermined number of points:
      indicating, by the one or more computing devices, that the point occupies the points added in the order the point was received and that the point's coordinates are mapped to the location.

2. The computer-implemented method of claim 1, wherein the point cloud data set is acquired from a laser range sensor.

3. The computer-implemented method of claim 1, wherein the points added are stored in a first in first out queue.

4. The computer-implemented method of claim 1, wherein the predetermined number of points is between 1,000 and 1,000,000,000 points.

5. The computer-implemented method of claim 1, wherein a three dimensional occupancy grid comprises the location.

6. The computer-implemented method of claim 5, wherein the three dimensional occupancy grid comprises an array of voxels.

7. The computer-implemented method of claim 5, wherein the three dimensional occupancy grid comprises a plurality of grid cells.

8. The computer-implemented method of claim 5, wherein the point cloud data set is acquired from a laser range sensor having an associated resolution and a resolution of the occupancy grid corresponds to the resolution of the laser range sensor.

9. A computing system comprising:
   one or more memory devices storing instructions; and
   one or more processors, configured to execute the instructions stored in the one or more memory devices in order to:
   receive a point of a point cloud data set, the point comprising three-dimensional coordinates, wherein the point is received in the order the point was detected;
   map the point's coordinates to a location to determine whether a different point's coordinates have already been mapped to the location;
   discard the point when a different point's coordinates have been mapped to the location;
   when a different point's coordinates have not been mapped to the location and a number of points added after discarding is equal to a predetermined number of points:
      indicate an oldest of the points added is no longer occupying the points added and that coordinates of the oldest of the points added are no longer mapped to a location associated with the coordinates of the oldest of the points added; and indicate that the point occupies the points added in the order the point was received and that the point's coordinates are mapped to the location; and when a different point's coordinates have not been mapped to the location and the number of points added is less than the predetermined number of points:

indicate that the point occupies the points added in the order the point was received and that the point's coordinates are mapped to the location.

10. The computing system of claim 9, wherein the predetermined number of points is between 1,000 and 1,000,000,000 points.

11. The computing system of claim 9, wherein a three dimensional occupancy grid comprises the location.

12. The computing system of claim 11, wherein the three dimensional occupancy grid comprises an array of voxels.

13. The computing system of claim 11, wherein the three dimensional occupancy grid comprises a plurality of grid cells.

14. The computing system of claim 13, wherein each grid cell consists of a single bit.

15. The computing system of claim 11, wherein the point cloud data set is acquired from a laser range sensor having an associated resolution and a resolution of the occupancy grid corresponds to the resolution of the laser range sensor.

16. A computer program product comprising a tangible non-transitory computer readable medium storing computer readable instructions that when executed by a processing device cause the processing device to perform operations, the operations comprising:

receiving a point of a point cloud data set, the point comprising three-dimensional coordinates, wherein the point is received in the order the point was detected;

mapping the point's coordinates to a location to determine whether a different point's coordinates have already been mapped to the location;

discarding the point when a different point's coordinates have been mapped to the location;

when a different point's coordinates have not been mapped to the location and a number of points added after discarding is equal to a predetermined number of points:

indicating an oldest of the points added is no longer occupying the points added and that coordinates of the oldest of the points added are no longer mapped to a location associated with the coordinates of the oldest of the points added; and indicating that the point occupies the points added in the order the point was received and that the point's coordinates are mapped to the location; and when a different point's coordinates have not been mapped to the location and the number of points added is less than the predetermined number of points:

indicating that the point occupies the points added in the order the point was received and that the point's coordinates are mapped to the location.

17. The computer program of claim 16, wherein the predetermined number of points is between 1,000 and 1,000,000,000 points.

\* \* \* \* \*